May 26, 1953 — K. E. WHITELEY — 2,639,952
SELF-LUBRICATING UNIVERSAL BEARING
Filed March 7, 1947 — 3 Sheets-Sheet 1
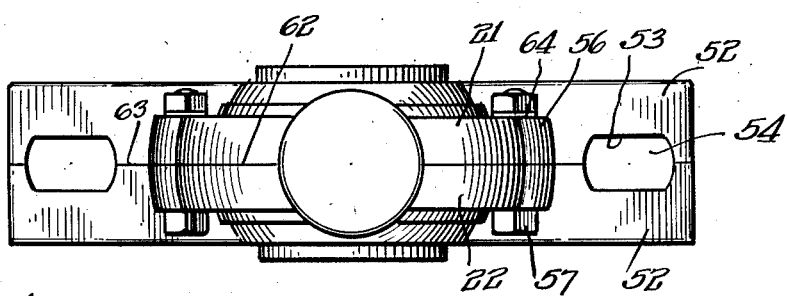
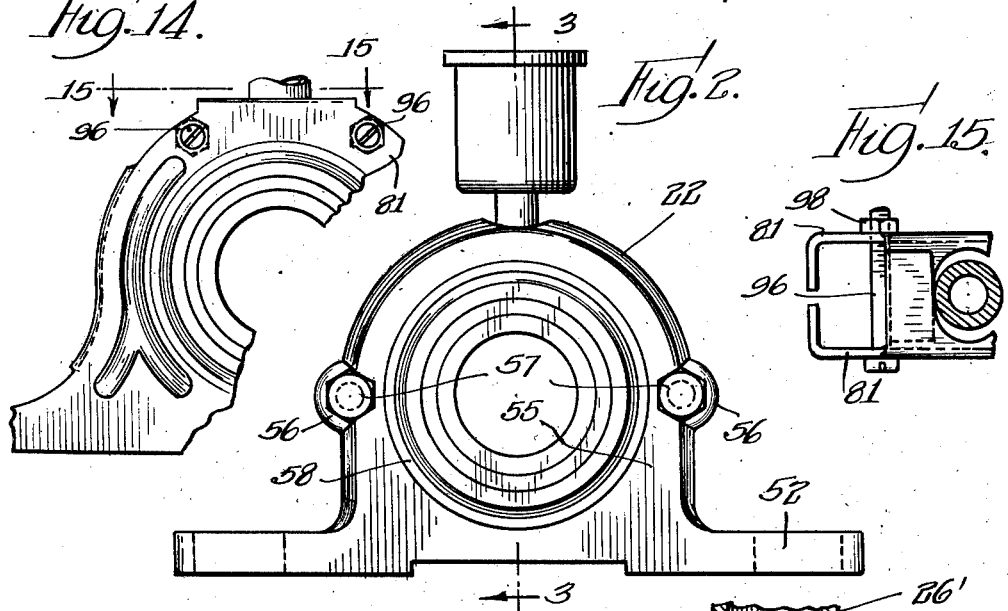
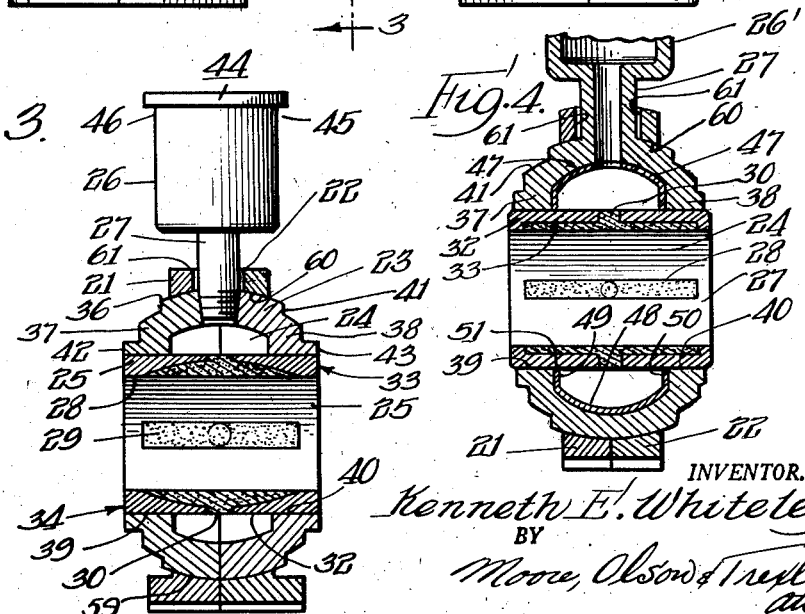
INVENTOR.
Kenneth E. Whiteley
BY Moore, Olson & Trexler
attys.

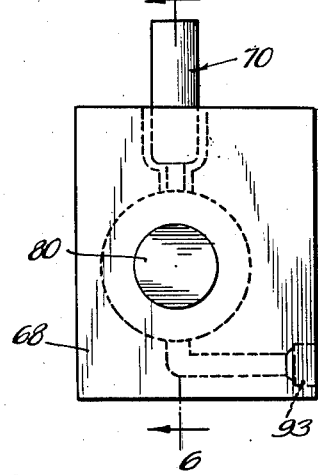
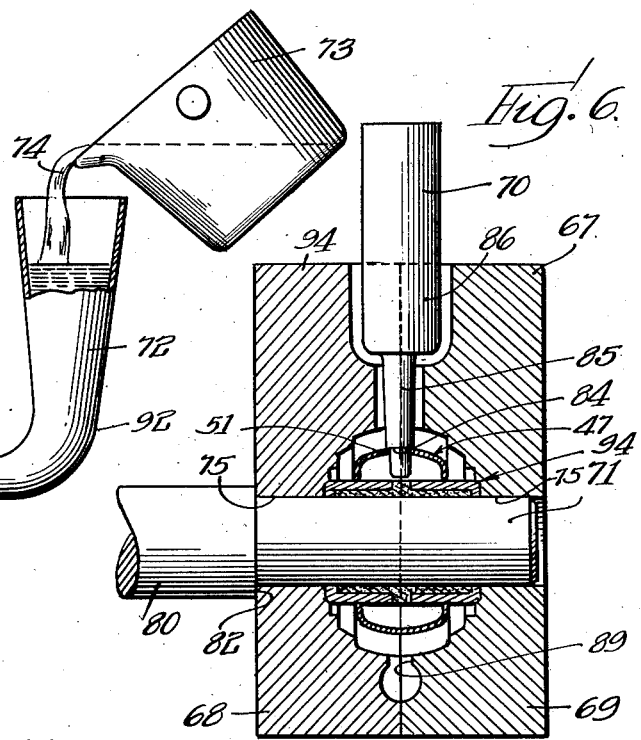
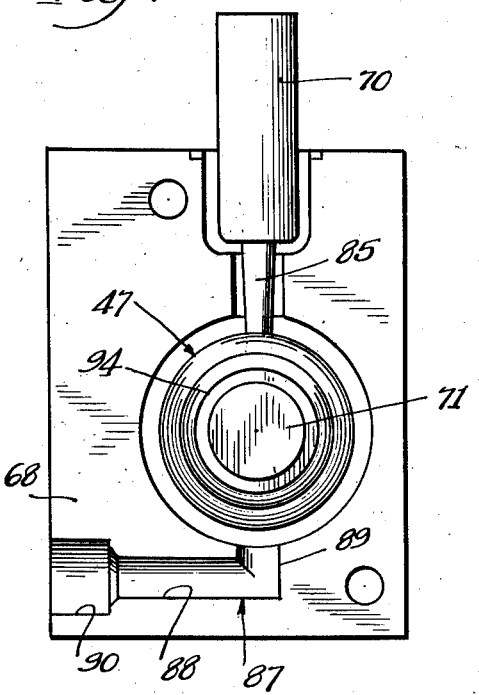
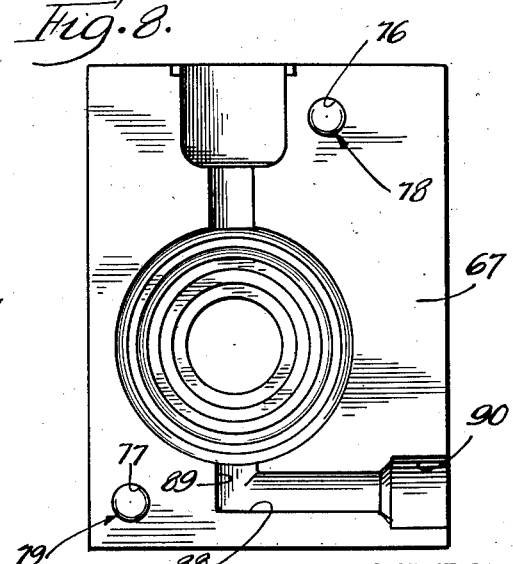

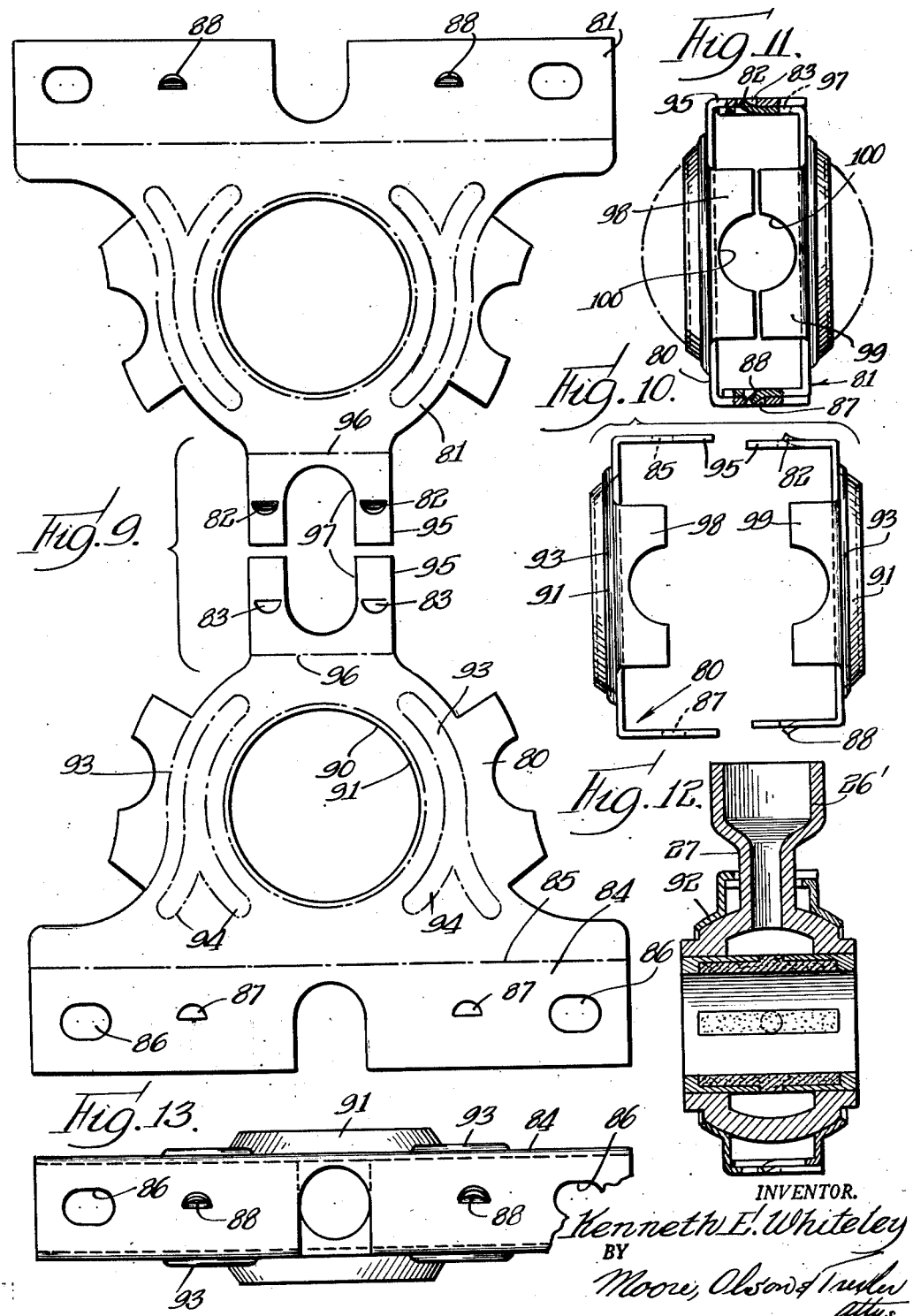

Patented May 26, 1953

2,639,952

UNITED STATES PATENT OFFICE 2,639,952

SELF-LUBRICATING UNIVERSAL BEARING

Kenneth E. Whiteley, Chicago, Ill., assignor to Randall Graphite Products Corporation, Chicago, Ill., a corporation of Delaware Application March 7, 1947, Serial No. 732,948

27 Claims. (Cl. 308—72)

The present invention relates to bearings of the self-lubricating type having a reservoir of the ball type and having an enclosing housing shaped so that the ball type bearing has a universal movement in the housing.

One of the objects of the present invention is to provide such type of bearing in a manner so that the amount of labor in the production of the bearing is greatly reduced and the amount of machining necessary is reduced to a minimum.

Another object of the invention resides in providing such a type of bearing wherein the ball type bearing is formed of cast metal having an integrally cast oil cup stem and oil cup wherein the oil cup itself is of larger cross sectional area than the stem whereby all of the parts of the bearing are integral and adapted to be made in one operation, thereby effecting a great saving in the cost of materials, labor and machining.

Yet another object of the invention resides in providing a so called spherical bearing formed of cast metal and wherein an annular metal shell of steel is cast directly in and as a part of the bearing to form an internal reservoir arranged to communicate with the oil conduit of the oil cup also cast as a part of the bearing.

Yet another object of the invention resides in the method of casting of the bearing.

Yet another object of the invention resides in providing a bearing which includes a two-piece housing which encloses the spherical bearing and wherein the housing is formed so that the bearing may have universal movement therein, being clamped or held in place by the securing of the two-part housing together, the spherical bearing being provided with an integrally cast oil cup including a neck portion and a cup portion proper which projects outwardly through an opening formed by portions of the two-part housing, and wherein the two-part housing is separable along a plane passing transversely vertically through the central axis of the bearing whereby to permit of the assembly of the bearing and its oil cup in the housing and the fastening together of the housing portions securely to hold the bearing universally in position therebetween.

Another object of the invention resides in providing a bearing of the foregoing character wherein the housing members are provided with means whereby the housing may be clamped together at the top with the bearing universally mounted therebetween and whereby the housing is provided with means for limiting angular movement of the stem of the bearing relatively to the opening in the housing in a direction about the axis of the bearing.

Another object of the invention resides in providing a two-piece sheet metal housing constructed and arranged to be interfitted and assembled about the spherical bearing member, the latter having an oil cup projecting outwardly through an opening between the members of the housing and preferably at the top thereof so that the bearing may be lubricated, and wherein the members of the sheet metal housing are provided with preferably integral portions adapted to be clamped together either by suitable fastening means or to be interconnected to clampingly hold the bearing universally mounted between the housing portions, and wherein also the housing members are provided with means for limiting rotation, in a direction angularly of the bearing, of the neck of the oil cup that projects outwardly between the assembled portions of the housing.

Yet another object of the invention resides in the construction of the two-part sheet metal housing for assembly about the spherical bearing.

Another object of the invention resides in providing the integrally cast bearing and its oil cup.

These and other objects of the invention will be apparent from a perusal of the following specification when taken in connection with the accompanying drawings, wherein:

Figure 1 is a plan view of the invention wherein the spherical bearing is housed within a pair of cast metal housing members;

Figure 2 is a side elevational view of the self-lubricating universal bearing shown in Figure 1;

Figure 3 is a cross sectional view taken on the line 3—3 of Figure 2;

Figure 4 is a modified form of bearing made in accordance with the apparatus shown in Figures 5 to 8 for casting the bearing with a steel annulus therein forming the lubricant chamber that communicates with the oil cup;

Figure 5 in a side elevational view of the apparatus for casting the reservoir and effecting its assembly with the bushing;

Figure 6 is a vertical sectional view of this apparatus taken on the plane of the line 6—6 of Figure 5, looking in the direction of the arrows;

Figure 7 is a vertical elevational view of the left-hand half of the mold of Figure 6, looking toward the left end of Figure 6;

Figure 8 is an elevational view of the right-hand half of the mold of Figure 6, looking toward the right-hand end of Figure 6;

Figure 9 is a divided or plan view of the sheet metal parts adapted to be used for the housing of a universal bearing of the type illustrated in Figure 1;

Figure 10 is a plan view of the parts of this sheet metal housing exploded after they have been bent to proper shape;

Figure 11 is a similar view, showing the housing after it has been assembled, with the other parts of the bearing indicated in dotted lines;

Figure 12 is a sectional view taken on a plane directly through the housing, parallel to the axis of the bearing, showing the details of construction of the complete bearing, and also showing the oil cup in section, and utilizing the sheet metal housing instead of the cast metal housing of Figure 3;

Figure 13 is a bottom plan view of the sheet metal type of housing;

Figure 14 is a view of the construction illustrated in Figure 12, but showing through bolts for attaching the upper housing portions together in lieu of the manner shown in Figure 9; and Figure 15 is a section taken on the line 15—15 of Figure 14.

The present application is a continuation-in-part of my prior application Serial No. 475,345, filed February 10, 1943, abandoned July 29, 1947, and also contains subject matter of my prior application Serial No. 364,675, filed November 7, 1940, abandoned February 26, 1943.

The bearings to which the present invention relates are preferably of the type having a housing having a pair of metal members adapted to be secured together, said members having large, centrally located side openings, and arranged to receive a spherical bearing therein in such a manner that the bearing may have universal movement with respect to the housing members. In the type of device illustrated in Figures 1 to 3, the housing comprises a pair of cast metal members 21 and 22 adapted to support a substantially ball-shaped member 23 which is hollowed out to form a reservoir 24. The ball-shaped member 23 supports the bearing bushing 25 and an oil cup 26 connected by the neck or conduit 27 to the reservoir 24. The bearing sleeve or bushing 25 may comprise a metal member having a substantially cylindrical inner surface 28 provided with a plurality of longitudinally extending grooves 29, the grooves communicating with the reservoir 24 by means of centrally disposed connecting portions 30. The bushing 25 has a substantially cylindrical outer surface 32 and plane end surfaces 33 and 34. The grooves 29 and the apertures 30 are filled with initially plastic carbon compound containing graphite which is pressed into the grooves and apertures, and baked to a porous condition so that the compound in the grooves serves to conduct lubricant and distribute it over the shaft in the bearing 25 while the plugs of graphite in the apertures 30 serve to conduct lubricant from the reservoir chamber 24 to the lubricant distributing members by virtue of their porosity.

In lieu of the grooved sleeves 25 I may provide ball bearing sleeves which are apertured to connect with the chamber 24 to lubricate the ball bearing sleeves. The ball-shaped member 23 that forms the reservoir 24 has an externally partially spherical bearing surface 36 for engagement with the parts of the housing members 21 and 22. This ball-shaped reservoir member 23 also has a pair of inwardly extending flanges 37 and 38 bordering the reservoir chamber 24, and these flanges 37 and 38 have the aligned coaxial cylindrical bores 39 and 40 for receiving the bushing or sleeve 25 with which they have a tight frictional fit. The ball-shaped reservoir member 23 may be relieved at 41 on each side of the spherical member 36; that is, it may have a lesser diameter, and the flanges 37 and 38 may have axially extending tubular extensions 42 and 43.

A tubular conduit 27 is preferably secured to the ball-shaped reservoir 23 and extends at right angles to the axis of the sleeve-like bushing 25. This conduit or stem 27 communicates with the interior of the reservoir chamber 24 and with the cup 26 which is integrally secured to or carried by the conduit or neck 27. The cup 26 may have a cast metal cover 44 with a depending flange 45 that is slotted to receive the integral lugs 46 carried by the side walls of the cup 26 to secure the cover on the cup. In other embodiments the cup and the cover may be screw threaded. In the illustration shown in Figure 3, the stem 27 of the cup is threaded to engage a threaded bore of the spherical reservoir member 23. This cup may be cast with the stem and cup formed integral therewith, as shown in Figure 12.

I prefer to have the spherical bearing member 23 with the stem and cup cast integral therewith, as shown in Figure 12, it being understood that in Figure 12 the housing members are of sheet metal and not of cast metal. However, the integral spherical bearing with integral stem and oil cup may be interchangeably used either with the cast metal housings or the sheet metal housings of Figures 3 and 12, respectively.

In Figure 4 of the drawings I have shown the reservoir as provided with an internal shell 47 which has a partially spherical wall 48 joined at each end to the inwardly extending flanges 49 and 50. These flanges 49 and 50 have the aligned through bores 51 so that they are adapted to receive the external surface 30 of the bushing, and the shell has an aperture at 51 in its spherical wall for providing communication through the shell to the conduit 26. This shell 47 may be made of any suitable metal, such as steel, or it may be made of various moldable materials which are adapted to withstand the heat to which the molten metal is subjected in making the casting. The purpose of the shell 47 is to form the reservoir chamber 24 during the casting operation while the ball-shaped reservoir member 23 is cast in direct assembly with the bushing or sleeve 25. The housing members 21 and 22 may be similar, and each of these housing members has an attaching flange 52 at each end, each flange being provided with a groove 53, which grooves, when in registration, eventually form an aperture 54 with the similar grooved member of the opposite flange 52. Thus I provide a simple means to pass the bolts through these apertures 54 for securing their bearing assembly to a support. It is obvious that other types of means may be provided for bolting the flange portions 52 to the support.

Each attaching flange has an upwardly extending flange 55 which is provided with apertures 56 for passing screw bolts 57 or other fastening means for securing the housing halves together. Each upwardly extending flange 55 has a through bore 58 through which the end portions of the ball-shaped reservoir 23 project, and each housing member has a partially spherical inner surface 59 and 60 correspondingly shaped for engaging the spherical surface 36 of the ball-shaped reservoir 23.

The housing members have registering grooves 61 at the top for forming an aperture through which the conduit or neck 27 of the oil cup passes, and the aperture formed by these grooves is larger than the conduit to permit a universal movement of the ball-shaped reservoir member in its housing. When the two housing members 21 and 22 are clamped together with the plane surfaces 62 and 63 engaging each other to form a partially spherical socket for receiving the ball-shaped reservoir 23 and permitting a limited universal movement therein. Spring washers 64 on the bolts 57 permit the bolts to place a resilient clamping action on the half housing members.

Referring now to Figures 5 to 8 of the drawings, these are views of the apparatus used in making the bearing as shown in Figure 4. The apparatus preferably includes a permanent mold 67 comprising the two mold halves 68 and 69, see Figure 6, and the permanent core 70, the mandrel or permanent core 71, and the funnel 72, see Figure 5. 73 indicates any conventional form of ladle used for pouring the molten metal 74. The permanent mold halves 68 and 69 may be substantially identical except that one is left-handed and the other is right-handed, as will be seen from Figures 7 and 8. Each is formed as a cavity of suitable size for forming the ball-shaped member 23, the conduit 27 and the cup 26 as follows. Each mold half has a through bore 75 for passing a permanent core 71, which is of the same size as the shaft intended to be used in the bearing.

The bores 75 are aligned when the mold halves are assembled, and the mold halves are provided with aligned bores 76, 77, which receive the metal dowel pins 78, 79, by means of which the mold halves are kept in alignment.

The permanent core 71 preferably has a cylindrical extension 80, with an annular shoulder 82 that determines its position in the bores 75. The bushing 25 is first constructed in the usual way, according to my prior patents, and is provided with the lubricant distributing compound 33, 34.

The bushing 25 may be slid endwise on the permanent core 71, and may be so located that its ends are engaged by the walls of the ball cavity 94 in the mold 67.

The reservoir forming shell 47 is then slid endwise on the bushing 25, if that has not already been done, to its proper position; and the permanent core 70 is placed in the cavity reserved for it, with its reduced cylindrical end 83 in the aperture 51 of the shell 47.

The annular shoulder 84 on the cylindrical portion 85 of the core 70 determines the position of the permanent core 70. The cylindrical portion 85 of the permanent core 70 forms the bore in the oil conduit 26, and the larger cylindrical portion 86 on the permanent core 70 forms the recess in the cup 26.

When the permanent core 70 has been properly placed, then the two halves of the mold may be assembled, being held in alignment by the frictional engagement of the bores 76, 77 with dowel pins 78, 79.

For filling the mold cavity, the mold halves are also preferably provided with the bottom pour conduit 87, having a horizontal portion 88 and an upwardly extending portion 89 that communicates with the bottom of the mold cavity, as seen in Figure 6.

The horizontal portion 88 of the conduit 87 has an enlarged cylindrical counterbore 90 for receiving the end of the funnel 72. The conduits 87—90 are formed by having grooves in the opposite mold halves.

The funnel 72 may consist of any member made of metal, such as steel, made of the same material as the mold, having an upper portion 91, an elbow 92, and an end portion 93 that has a frictional fit in the counterbore 90.

The method of making the bearings is as follows: After the mold has been assembled as indicated, molten metal is poured in the funnel 72, by means of the ladle 73, and it passes down the funnel through the elbow 92 and the conduit 87 into the mold cavity 82 at the bottom thereof.

The molten metal rises in the mold cavity to a level which depends upon the height of the molten metal 74 in the funnel 72, and the funnel is preferably filled to such a point that the molten metal comes up to the upper surface 67 of the mold, and it may pass up out of the top of the mold, necessitating the cutting off of the top of the cup, if desired.

The mold 67 being made of steel, it may be used over and over again, and its inner surface may be machined to such a smooth condition that the casting need not be machined in any way.

The bearings are preferably cast of metal, such as die cast metal, or any other non-ferrous alloy having a lower melting point than the material of which the mold is made; and the casting is preferably carried on according to the usual practice in casting, by permanent mold.

By bottom pouring I find that a more sound casting may be made, as there is less disturbance of the molten metal as it passes into the mold. After the mold has been filled with metal, a chill is effected by means of a steel mold so that the casting is congealed; and after the casting has congealed, the parts of the mold are separated, and the permanent cores are withdrawn.

As distinguished from the prior art, in which the bushing had to be reamed out after assembly, in this case the bushing has not been squeezed, and no further reaming is necessary. The permanent mold gives the casting such a smooth finish that no machining is necessary, and the ball reservoir may be assembled with the housing without intermediate machining operations.

The shell 47 stays in the casting after having performed its function of forming the reservoir chamber.

It will thus be observed that I have invented an improved bearing and an improved method of making it, which eliminates all the machining operations that were formerly necessary on the ball reservoir or on the bushing after assembly with the ball reservoir.

The present bearing may be constructed at a small fraction of the cost of the bearings made according to the prior art.

Figures 9 to 12 show the construction of the self-lubricating universal bearing wherein the housing members are made of sheet metal but are so constructed that the two half housings may be taken apart and reassembled at any time, just as the cast metal housing members shown in Figures 1, 2 and 3 may be taken apart and reassembled.

Referring now to Figure 9, the half housing members 80 and 81 are either shown in divided form or in the form of blanks, the blanks being substantially similar in construction except for the fact that one of the blanks has outwardly pressed spring tongues 82 and the other has corresponding complementary apertures 83 in which these tongues are adapted to interfold and engage, as shown in Figure 11. Thus the sheet metal member 80 has an attaching flange portion 84 which is that part in Figure 9 defined below the line 85 where the blank is intended to be folded. The portion 84 of the member 80 has a relatively oblong aperture 86 located midway of the flange adjacent each end, and it has the half circular apertures 87 located to be engaged by the tongues 88 of the member 81 when the parts are assembled as shown in Figure 12. The oblong apertures 86 in each of these members 80 and 81 are so located that they register with each other when the housing assembly is in the position shown in Figures 12 and 13. Bolts passing through the apertures 86 secure the attaching flanges 83 to a support and hold these attaching flanges together, keeping the housing assembled at the lower part of the housing. This part of the housing is, however, also held in assembled position by the downwardly turned tongues 88, see Figures 9, 12 and 13, which engage in the apertures 87. At the top the housing members are held together by the upwardly extending tongues 82 which engage in the apertures 83. The body of the stamping 80 may be defined as that part above the attaching flange 84 or above the line 85 where the stamping is folded. This body is formed with a centrally located aperture 90 and with an outwardly extending, pressed, tubular flange 91 which has an inner, partially spherical surface 92, or it may have a substantially frusto-conical inner surface 92. The legs of the body of the stamping 80 are preferably formed with reinforcing ribs 93 which may be provided with forked extensions 94 at the bottom for increasing the stiffness of the sheet metal. At the top each stamping is formed with the securing flange 95 which flanges are intended to be bent at right angles to the body along the lines indicated at 96. The stamping 81 is formed with tongues 82 and stamping 80 with apertures 83. Both stampings are formed with the groove or slot 97 which is adapted to provide an aperture, see Figures 9 and 11, when the two flanges 95 are assembled as shown in Figures 11 and 12. This aperture 97 is adapted to pass the stem 27′ of an oil cup of the type shown at 26′ or the stem 26 of the other oil cup of the type shown at 27, see Figure 3.

In order to stiffen the body of the stampings 80, 81, they may each be provided with additional abutting flanges 98, 99 on each side, so that the sides of the housing are also substantially enclosed, except for the apertures 100.

The side apertures 100 may also be used to pass the discharge tubes 46 or 51 of an oil cup so that the bearing may be mounted on a vertical surface with the oil cup projecting upward, its stem passing through one of the apertures 100.

In another embodiment of the invention the two halves 81 of this sheet metal housing may be secured together by through bolts 97 or fastening members having nuts 98 and preferably provided with spring washers for clamping the members together on the ball-shaped reservoir member, just as are the two housing members 21 and 22 held together in the manner shown in Figures 1 and 2.

As distinguished from the sheet metal bearings of the prior art, which were made out of one piece, and so folded that they were substantially destroyed when the bearing was taken apart, these housing members may be taken apart at any time and again assembled with a reservoir element in such manner that the bearings may be moved about and located in different parts of the machinery, as desired.

It will thus be observed that I have invented an improved self-lubricating bearing housing which may be made by die casting or by using metal stampings which can be punched, stamped, and drawn in such manner that the machining operations necessary for the prior art devices are substantially eliminated.

The reservoir member is also adapted to be made by die casting, and provided with such smooth surfaces, according to that method, that it is unnecessary to do any machining on the spherical surfaces, which has been a very expensive operation required for the devices of the prior art.

The bushings may also be made without the necessity for cutting grooves in the bushing, since the grooves are cast into the bushing and the apertures between the grooves and the reservoir are provided by the act of making the wall thinner when the bushing is trimmed down and finished on its exterior cylindrical surface.

The present bushings may also be manufactured at a much lower cost than the devices of the prior art, and may be provided with lubricant apertures, without necessity for any drilling. Thus the cost of the complete self-lubricating universal bearings is substantially reduced, so that it is possible to sell them at such a low price that they can be used in a great many places where the devices of the prior art would be too expensive.

As the grooves of my bushings are formed by casting, they have a roughened surface which is better adapted to retain the porous carbon compound in them and there is a better adhesion between the porous carbon compound filling of the grooves and the wall of the grooves.

Obviously the invention is not limited to the specific details of construction disclosed herein but is capable of other modifications and changes without departing from the spirit and scope of the appended claims.

Having thus described the invention, what is claimed as new and desired to be secured by Letters Patent is:

1. A bearing of the self-lubricating universal type comprising a pair of similar half housing members fitted together to form a supporting housing, each of said half housing members being formed with an attaching flange, and each attaching flange having a groove in one of its engaging edges which forms an aperture in the attaching flanges where they are joined together, each of said halves also comprising an upwardly extending body portion which is formed with an annulus, and each annulus having a partially spherical inner surface, each annulus also having a pair of apertures for securing members, the apertures on the respective halves registering with each other and having securing members therein, and a bearing member comprising a cast metal member formed with an exterior partially spherical surface rotatably mounted on said inner partially spherical surfaces, said cast metal member being cast upon a cylindrical bearing of the lubricating type and extending about said bearing, and being provided with an inner metallic shell of annular shape located on said bearing and forming an annular lubricant chamber.

2. A bearing of the self-lubricating universal type comprising a pair of similar half housing members fitted together to form a supporting housing, each of said half housing members being formed with an attaching flange, and each attaching flange having a groove in one of its engaging edges which forms an aperture in the attaching flanges where they are joined together, each of said halves also comprising an upwardly extending body portion which is formed with an annulus, and each annulus having a partially spherical inner surface, each annulus also having a pair of apertures for securing members, the apertures on the respective halves registering with each other and having securing members therein, and a bearing member comprising a cast metal member formed with an exterior partially spherical surface rotatably mounted on said inner partially spherical surfaces, said cast metal member being cast upon a cylindrical bearing of the lubricating type and extending about said bearing, and being provided with an inner metallic shell of annular shape located on said bearing and forming an annular lubricant chamber, said cast metal member being provided with an integral, radially extending tubular conduit registering with an aperture in said shell, and said conduit being formed at its outer end with a lubricant cup and cover means for said cup.

3. A bearing of the self-lubricating universal type comprising a pair of similar half housing members fitted together to form a supporting housing, each of said half housing members being formed with an attaching flange, said attaching flanges having means for attachment to a support, each of said halves also comprising an upwardly extending body portion which is formed with an annulus, and each annulus having a partially spherical inner surface, a bearing member comprising a cast metal member formed with an exterior partially spherical surface rotatably mounted on said inner partially spherical surfaces, said cast metal member being cast upon a cylindrical bearing of the lubricating type and extending about said bearing, and being provided with an inner metallic shell of annular shape located on said bearing and forming an annular lubricant chamber, and means clamping said half housing members in assembled relation about said cast metal bearing member.

4. A bearing of the self-lubricating universal type comprising a pair of similar half housing members fitted together to form a supporting housing, each of said half housing members being formed with an attaching flange, said attaching flanges having means for attachment to a support, each of said halves also comprising an upwardly extending body portion which is formed with an annulus, and each annulus having a partially spherical inner surface, a bearing member comprising a cast metal member formed with an exterior partially spherical surface rotatably mounted on said inner partially spherical surfaces, said cast metal member being cast upon a cylindrical bearing of the lubricating type and extending about said bearing, and being provided with an inner metallic shell of annular shape located on said bearing and forming an annular lubricant chamber, said cast metal member being provided with an integral, radially extending tubular conduit registering with an aperture in said shell, and said conduit being formed at its outer end with a lubricant cup and cover means for said cup, and means clamping said half housing members in assembled relation about said cast metal bearing member.

5. A bearing of the self-lubricating universal type comprising a pair of separable complementary half housing members adapted to fit together to form a bearing supporting housing, said housing members comating along a plane perpendicular to the axis of the shaft to be supported by the bearing, means for securing said housing members together, said housing members comating to define an annular chamber having substantially spherical portions, bearing means within said chamber having spherical surfaces comating with the spherical surfaces of said housing members, whereby said bearing means is self-aligning in respect to the housing members, and an attaching flange formed on each said housing member, said attaching flanges lying in a plane disposed substantially perpendicular to the plane of the comating edges of said housing members.

6. A bearing of the self-lubricating universal type comprising a pair of separable complementary half housing members adapted to fit together to form a supporting housing for a bearing adapted to support a shaft, said housing members comating along a plane perpendicular to the axis of the shaft to be supported by the bearing, means for securing said housing members together, said housing members comating to define an annular chamber having substantially spherical portions, bearing means within said chamber having spherical surfaces comating with the spherical surfaces of said housing member and comprising an annular casting having an annular cavity, a sleeve within said cavity, the sleeve also defining an annular chamber arranged circumferentially of and within the sleeve.

7. A bearing of the self-lubricating universal type comprising a pair of separable complementary half housing members adapted to fit together to form a supporting housing for a bearing adapted to support a shaft, said housing members comating along a plane perpendicular to the axis of the shaft to be supported by the bearing, means for securing said housing members together, said housing members comating to define an annular chamber having substantially spherical portions, bearing means within said chamber having spherical surfaces comating with the spherical surfaces of said housing member and comprising an annular casting having an annular cavity, a steel pressed annular shell within said cavity also defining an annular chamber arranged circumferentially of and within the shell.

8. A bearing of the self-lubricating universal type comprising housing means adapted to form a bearing support, said housing means defining an annular chamber having a spherical portion, an annular casting having an annular cavity and an annular steel shell within said cavity, and a sleeve-like bearing fitting in the annular walls of said spherical casting and forming with the interior walls of said annular spherical steel shell a lubricant chamber.

9. A bearing of the self-lubricating universal type comprising a pair of similarly formed half housing members fitted together to form a supporting housing, said housing members comating along a plane perpendicular of the axis of the shaft to be supported by said bearing, each of said half housing members being formed with an attaching flange and each of said half housing members also comprising an upwardly extending body portion formed with an annulus, each annulus having a partially spherical inner surface and each having a centrally disposed aperture of relatively large diameter, a bearing member comprising a cast metal member formed with an exterior, partially spherical surface rotatably mounted on said inner, partially spherical surface of said housing member, said cast metal member being cast upon a bearing of the lubricating type and extending about said bearing and being provided with an inner metallic shell of annular shape located on said bearing and forming an annular lubricant chamber, said cast metal member being provided with an integrally cast, laterally extending tubular conduit passing through complementary registering apertures in the upper surfaces of said pair of housing members, said laterally extending tubular conduit having an integral cup-like extension of greater diameter than said complemental registering apertures of said housing members to form a lubricant cup, and means clamping said housing members together about said bearing member.

10. A bearing of the self-lubricating universal type adapted to support a shaft comprising a pair of similarly formed half housing members fitted together to form a supporting housing, said housing members comating along a plane perpendicular of the axis of the shaft to be supported by said bearing, each of said halves also comprising an upwardly extending body portion which is formed with an annulus and each annulus having a partially spherical inner surface and each annulus also being formed with a relatively large central bore or opening, the bores or openings on the respective halves registering with each other, a bearing member comprising a cast metal member formed with an exterior, partially spherical surface rotatably mounted on said inner partially surface of said housing member with the spherical surfaces projecting through the bore or opening of each annulus, said cast metal member being cast upon a spherical bearing of the lubricating type and extending about said bearing and being provided with an inner metallic shell located on said bearing and forming an annular lubricant chamber, and means fastening said pair of housing members together to hold said bearing member in position therebetween.

11. A bearing of the self-lubricating universal type comprising a pair of similar half housing members fitted together to form a supporting housing, said housing members comating along a plane perpendicular to the axis of the shaft to be supported by the bearing, said housing members comating to define an annular chamber having substantially spherical portions, the registering comating edges of said housing at their top being provided with complementary notched portions forming an opening thereat, and registering, relatively large, central apertures, and a cast metal bearing member formed with exterior, partially spherical surfaces adapted to be rotatably mounted on said inner, partially spherical surfaces and having portions adapted to project through said registering apertures of said housing, said cast metal member being cast upon a bearing of the lubricating type and extending about said bearing, and said cast metal member having an integral, cast, radially extending, tubular conduit projecting through the registering portions forming an opening in the top comating portions of said members, that portion of said radial conduit projecting beyond said opening having an integral, cast, cup-like upper portion of greater cross-sectional area than the cross-sectional area of said opening formed by said registering portions, and means for clamping said housing members about said cast metal member.

12. A bearing of the self-lubricating universal type comprising a cylindrical bearing sleeve adapted to receive a shaft, means comprising a member having a spherical outer surface for holding said bearing sleeve and a casing structure for retaining said spherical surface member, said casing structure being separable at the top in a direction extending axially of the shaft and having means clamping the casing structure against axial separation at the top, said bearing surface having an oil cup connected thereto, said oil cup having a stem passing outwardly through an opening formed in the casing structure.

13. A bearing of the self-lubricating universal type comprising a bearing sleeve for receiving a shaft therein, a concentrically surrounding spherical bearing having an opening corresponding to and receiving said bearing sleeve, and a casing surrounding and having self-aligning openings for clamping against and holding said spherical bearing in the casing, said casing including separable complementary half casing members comating along a plane perpendicular to the axis of the shaft to be supported by the bearing, said spherical bearing member having an oil cup connected to the spherical bearing member by means of a hollow stem, said hollow stem projecting outwardly through and opening in the concentrically surrounding housing, and means on the housing for limiting the angular movement of the oil stem relatively to the surrounding housing.

14. As an article of manufacture, a spherical bearing for a self-lubricating universal type of bearing, said spherical bearing being formed of cast metal and being provided with spherically shaped outer surfaces and an axially extending bore to receive a bearing sleeve, the central portion of said spherical bearing being hollow to provide an annular cavity to form a lubricant chamber, a portion of said spherical bearing having an opening connecting with said annular cavity, and an integral annular stem projecting radially outwardly from said spherical bearing, the outer end of said annular stem having an integral oil cup of greater cross section than the stem.

15. A cast bearing comprising an annular casting having external annular spherical walls spaced apart, said annular casting having walls to define an internal central passage of relatively large diameter to receive a bearing sleeve therein, the inner portions of said annular casting being hollow to provide a lubricant chamber, a portion of the wall of said annular casting having a bore connecting with said lubricant chamber, said annulus having an integral, radially projecting integral tubular wall registering with said bore to provide a lubricant cup stem, the outer end of said stem having an oil cup formed integrally therewith.

16. In a self-lubricating bearing of the self-aligning type, the combination of a pair of housing members each provided with a relatively large, centrally disposed opening, a cast metal bearing having spherical outer portions lying in said openings, the walls of said openings of said housing members corresponding with the spherical walls of said bearing whereby to permit said bearing to align itself with respect to the housing members, said spherical bearing comprising an annulus formed with a central, relatively large opening, a bearing sleeve disposed in said opening, said housing members separating on a plane passing transversely through the axis of said sleeve, the interior of said annulus being hollowed about said sleeve to provide a central cavity, said spherical bearing having a radially disposed opening communicating with said central cavity and the walls of said cast metal, spherical bearing being provided with a radially extending tubular projection registering with said opening to provide an integral lubricant oil cup stem, the outer end of said lubricant oil cup stem being provided with an enlargement in the form of an oil cup, the cross sectional area of said oil cup being relatively greater than the cross sectional area of said stem, and means for holding said housing members in clamped relation about and with respect to said spherical bearing.

17. In a self-lubricating bearing of the self-aligning type, the combination of a pair of housing members each provided with a relatively large, centrally disposed opening, a cast metal bearing having spherical outer portions lying in said openings, the walls of said openings of said housing members corresponding with the spherical walls of said bearing whereby to permit said bearing to align itself with respect to the housing members, said spherical bearing comprising an annulus formed with a central, relatively large opening, a bearing sleeve disposed in said opening, said housing members separating on a plane passing transversely through the axis of said sleeve, the interior of said annulus being hollowed about said sleeve to provide a central cavity, said spherical bearing having a radially disposed opening communicating with said central cavity and the walls of said cast metal, spherical bearing being provided with a radially extending tubular projection registering with said opening to provide an integral lubricant oil cup stem, the outer end of said lubricant oil cup stem being provided with an enlargement in the form of an oil cup, the cross sectional area of said oil cup being relatively greater than the cross sectional area of said stem, and means for holding said housing members in clamped relation about and with respect to said spherical bearing, the outer surface of said spherical bearing being the naturally unfinished but relatively smooth surface formed on said member by die casting.

18. A self-lubricating bearing comprising a bearing bushing having lubricating members in its bearing surface and having communication with the outside of said bushing, a reservoir member surrounding said bushing and having a partially spherical outer surface, a pair of sheet metal housing members having opposed partially spherical surfaces, said housing members being separated on a plane extending at right angles to the plane of the axis of said bearing bushing, separable means securing said housing means together to support said reservoir member and bushing, said housing members each having an attaching flange, and each attaching flange being formed with grooves, the grooves in adjacent attaching flanges forming apertures for the reception of bolts to secure said housing members to supports, said reservoir member having a filling aperture, a tubular conduit leading to said aperture, and an oil cup carried by said tubular conduit, said housing members having an enlarged aperture surrounding said conduit to permit universal movement of said reservoir member.

19. A self-lubricating bearing comprising a bearing bushing having lubricating members in its bearing surface and having communication with the outside of said bushing, a reservoir member surrounding said bushing and having a partially spherical outer surface, a pair of housing members having opposed partially spherical surfaces, said housing members being separated on a plane extending at right angles to the plane of the axis of said bearing bushing, separable means for securing said housing means together to support said reservoir member and bushing, said housing members each having an attaching flange, said reservoir member having a filling aperture, a tubular conduit leading to said aperture, and an oil cup carried by said tubular conduit, said housing members having an enlarged aperture surrounding said conduit to permit universal movement of said reservoir member, and said oil cup and conduit being cast integrally with said reservoir member, said housing members comprising separate sheet metal stampings formed with overlapping attaching flanges having registering apertures, and having apertured flanges for said conduit on a plurality of the sides of said housings.

20. A self-lubricating bearing comprising a bearing bushing or sleeve adapted to receive a shaft, a reservoir member surrounding said bushing and having a partially spherical outer surface, a pair of sheet metal housing members having opposed partially spherical surfaces, said sheet metal housing members being separated on a plane extending at right angles to the axis of said bearing bushing or sleeve, separable means for securing said housing members together to support said spherical reservoir member and bushing, said spherical reservoir member having a filling aperture, a tubular conduit leading to said aperture and an oil cup carried by said tubular conduit, said housing members about said conduit being spaced apart to permit universal movement of said reservoir member, said oil cup and conduit being cast integrally with said reservoir member, and said housing having means adapted to receive fastening members therethrough whereby to hold said housing members housed about said spherical reservoir member.

21. In a bearing, the combination of a bearing reservoir member having a central reservoir chamber and provided with an externally ball-shaped body, sheet metal housing means including parallel disposed sheet metal side members each having a central registering opening, the margins of said openings being correspondingly formed to receive the spherical portions of said reservoir body and portions of said body projecting through said openings, said spherical external reservoir body having a central opening, a bearing sleeve fitting therein, said sheet metal sides having a bottom portion formed with means whereby said sheet metal housing means may be attached to a support, the upper portions of said parallel sheet metal sides being spaced apart, said spherical reservoir bearing member having an oil cup and a hollow stem connected therewith passing outwardly between the upper portions of said sheet metal sides, the inner end of said stem connecting to said reservoir bearing chamber and the parallel sheet metal side members having spaced registering openings, and fastening means passing transversely of the planes of said sheet metal sides and through said registering openings and clampingly holding said sheet metal means against the enclosing cast metal reservoir bearing member.

22. A bearing of the self-lubricating, self-aligning type comprising sheet metal housing means having a pair of basal sheet metal portions of predetermined width and forming a basal portion provided with openings by which the same may be fastened to a support, said basal portions having parallel upstanding sheet metal projections, said projections being provided with registering, relatively large apertures, the margins of the apertures being formed with spherical seats, a cast metal reservoir member having external spherical walls corresponding with the contour of the seats of said openings, said reservoir member lying within said openings with the spherical outer walls contacting said seats, said cast metal reservoir member having a central bore, a bearing sleeve in said bore, the internal walls of said reservoir member about said sleeve being hollowed to provide a reservoir, a portion of the walls of said reservoir member having an internal conduit communicating with said reservoir, said walls extending radially outwardly to provide a hollow stem communicating with said bore, the outer end of said stem being provided with an oil cup, said stem projecting outwardly between the spaced upper wall portions of said sheet metal projections, said basal portions having aligned openings, fastening bolts passing through said openings whereby to clamp said side members against said reservoir member, the upper portions of said parallel sheet metal projections having means engaging the stem of said oil cup to limit angular movement of said oil cup about the axis of said bearing sleeve.

23. A bearing of the self-lubricating, self-aligning type comprising sheet metal housing means having a pair of basal sheet metal portions of predetermined width and forming a basal portion provided with openings by which the same may be fastened to a support, said basal portions having parallel upstanding sheet metal projections, said projections being provided with registering, relatively large apertures, the margins of the apertures being formed with spherical seats, a cast metal reservoir member having external spherical walls corresponding with the contour of the seats of said openings, said reservoir member lying within said openings with the spherical outer walls contacting said seats, said cast metal reservoir member having a central bore, a bearing sleeve in said bore, the internal walls of said reservoir member about said sleeve being hollowed to provide a reservoir, a portion of the walls of said reservoir member having an internal conduit communicating with said reservoir, said walls extending radially outwardly to provide a hollow stem communicating with said bore, the outer end of said stem being provided with an oil cup, said stem projecting outwardly between the spaced upper wall portions of said sheet metal projections, the upper portions of said parallel sheet metal sides having interconnecting means about the outwardly projecting stem of said oil cup for limiting angular movement of said stem about the axis of said bearing sleeve.

24. A bearing of the self-lubricating, self-aligning type comprising sheet metal housing means having a pair of basal sheet metal portions of predetermined width and forming a basal portion provided with openings by which the same may be fastened to a support, said basal portions having parallel upstanding sheet metal projections, said projections being provided with registering, relatively large apertures, the margins of the apertures being formed with spherical seats, a cast metal reservoir member having external spherical walls corresponding with the contour of the seats of said openings, said reservoir member lying within said openings with the spherical outer walls contacting said seats, said cast metal reservoir member having a central bore, a bearing sleeve in said bore, the internal walls of said reservoir member about said sleeve being hollowed to provide a reservoir, a portion of the walls of said reservoir member having an internal conduit communicating with said reservoir, said walls extending radially outwardly to provide a hollow stem communicating with said bore, the outer end of said stem being provided with an oil cup, said stem projecting outwardly between the spaced upper wall portions of said sheet metal projections, said upper portions of said sheet metal sides having additional means for holding the same in clamped relation enclosing said reservoir member.

25. A housing for a bearing member provided with spaced, partly spherical, external bearing aligning surfaces comprising a pair of separable complementary half housing members for enclosing said bearing member, said housing members comating along a plane perpendicular to the axis of the shaft to be supported by the bearing, means for securing said housing members together, said housing members comating to define an annular chamber having substantially spherical portions adapted to cooperate with said partly spherical bearing aligning surfaces, and attaching means formed on said housing including means to attach said housing to a surface disposed substantially parallel to the axis of the shaft being supported.

26. A housing for a bearing member provided with spaced, partly spherical, external bearing aligning surfaces and a lubricant conduit connecting therewith comprising a pair of separable complementary half housing members for enclosing said bearing member, said housing members comating along a plane perpendicular to the axis of the shaft to be supported by the bearing, means for securing said housing members together, said housing members comating to define an annular chamber having partly spherical portions adapted to cooperate with the partly spherical bearing aligning surfaces, and means formed on one side of said housing to receive said lubricant conduit.

27. A housing for a bearing member provided with spaced, partly spherical external bearing aligning surfaces comprising a pair of similar half housing members adapted to fit together to form a supporting housing, each of said half housing members being formed with an attaching flange, each attaching flange having a groove in one of its engaging edges which forms an aperture in the attaching flanges where they are joined together, each of said half housing members including an upwardly extending body portion which is formed with an annulus, and each annulus having a partly spherical inner surface adapted to cooperate with the partly spherical bearing aligning surfaces, each annulus having a pair of apertures for securing members, the apertures on the respective halves registering with each other.

KENNETH E. WHITELEY.

(References on following page)

References Cited in the file of this patent

UNITED STATES PATENTS

| Number | Name | Date |
|---|---|---|
| 136,198 | Aland | Feb. 25, 1875 |
| 1,562,130 | Stitzinger | Nov. 17, 1925 |
| 1,606,747 | Carter | Nov. 16, 1926 |
| 1,838,582 | Skillman | Dec. 29, 1931 |
| 1,844,552 | Bailey | Feb. 9, 1932 |
| 1,983,368 | Hathorn | Dec. 4, 1934 |
| 2,048,763 | Whiteley | July 28, 1936 |
| 2,123,872 | Whiteley | July 12, 1938 |
| 2,138,659 | Kindig | Nov. 29, 1938 |
| 2,157,453 | Jaeger | May 9, 1939 |
| 2,212,218 | Whiteley | Aug. 20, 1940 |
| 2,270,392 | Talmage | Jan. 20, 1942 |
| 2,289,689 | Wilson | July 14, 1942 |
| 2,300,034 | McWane | Oct. 27, 1942 |